United States Patent

[11] 3,613,802

[72] Inventors V. Robert Carlson
Aurora;
Joseph Dinelli, Glenview, Ill.; Joel F. Jones,
Claremore, Okla.
[21] Appl. No. 833,515
[22] Filed June 16, 1969
[45] Patented Oct. 19, 1971
[73] Assignee International Harvester Company
Chicago, Ill.

[54] SAND TRAP RAKE FOR GOLF COURSES
9 Claims, 9 Drawing Figs.
[52] U.S. Cl. .................................................. 172/197,
172/620
[51] Int. Cl. .................................................. A01b 19/04,
A01b 23/04
[50] Field of Search .......................................... 172/197,
198, 620

[56] References Cited
UNITED STATES PATENTS
1,447,862  3/1923  Jones .......................... 172/197
1,585,307  5/1926  Maney ........................ 172/197
2,994,388  3/1961  Ryan ........................... 172/198

FOREIGN PATENTS
224,955  12/1962  Austria ......................... 172/197
961,369  5/1950  France ......................... 172/197

OTHER REFERENCES
John Deere, Tractor-Controlled Spring-Tooth Harrow TH448H, Sept. 7, 1955, pages 8 and 14, and Front Cover, 172–197.

Primary Examiner—Robert E. Pulfrey
Assistant Examiner—C. W. Hanor
Attorney—Floyd B. Harman ABSTRACT: A sand trap rake mounted on the tractor comprising a transverse mounting member, a plurality of hitch elements spaced transversely of the mounting member and secured thereto and a V-shaped draft frame member connected to each hitch element, a rake connected to each frame member for floating movement therewith, each frame member having its apex adjacent to the respective hitch element and a universal connection fastening each draft member at its apex to the related hitch element and a toothed comb hung behind each rake for smoothing the sand, each frame being connected to the rockshaft in turn is connected to hydraulic lift of the tractor such that the operator in exiting from the sand trap may incrementally lift the rake to feather the action of the rake on the sand thereby preventing dragging it out of the sand trap.

Inventors:
V. Robert Carlson
Joseph Dinelli
Joel F. Jones
By John J. Kowalik
Atty.

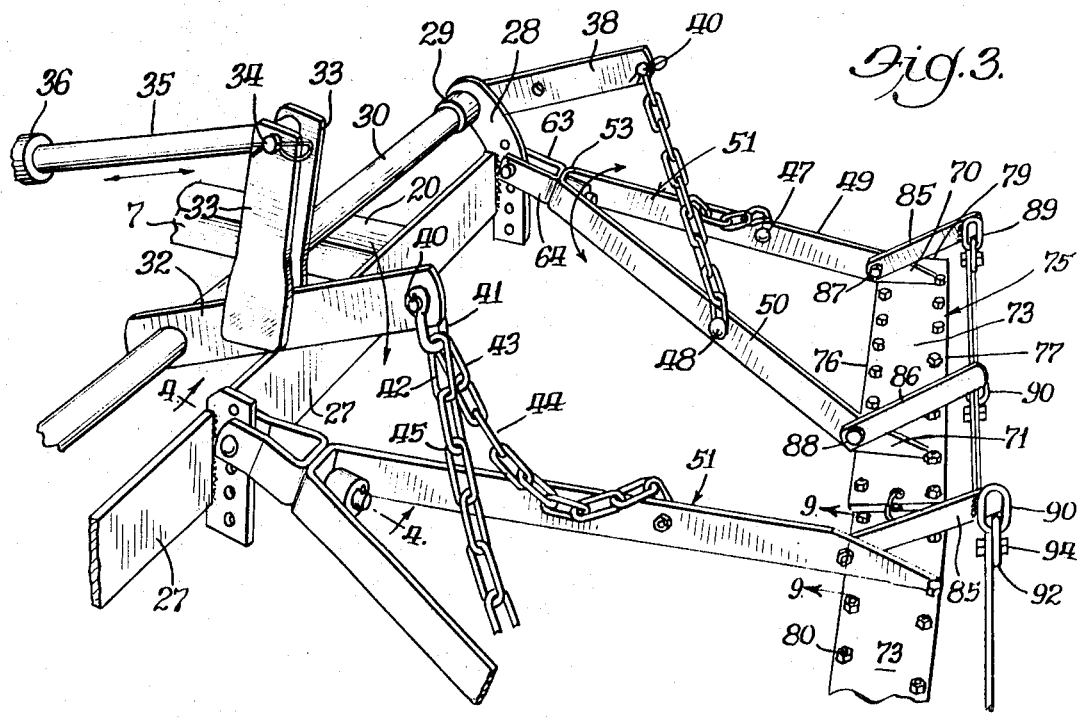
Fig.3.
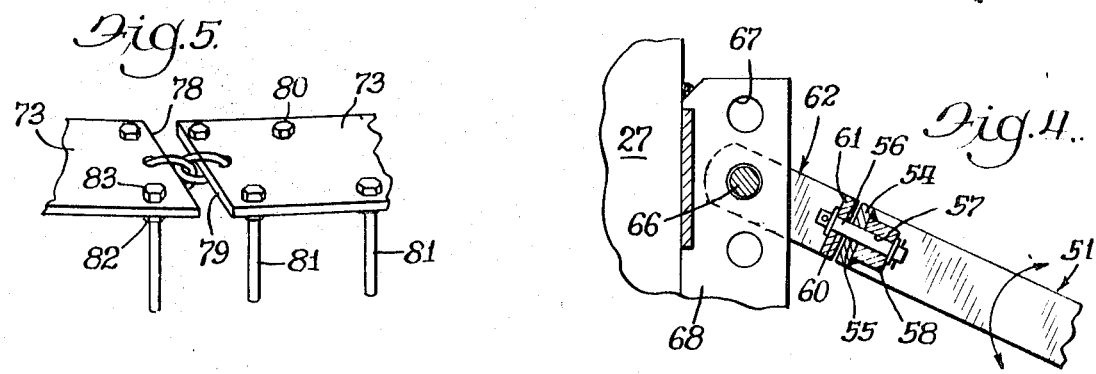
Fig.5.
Fig.4.
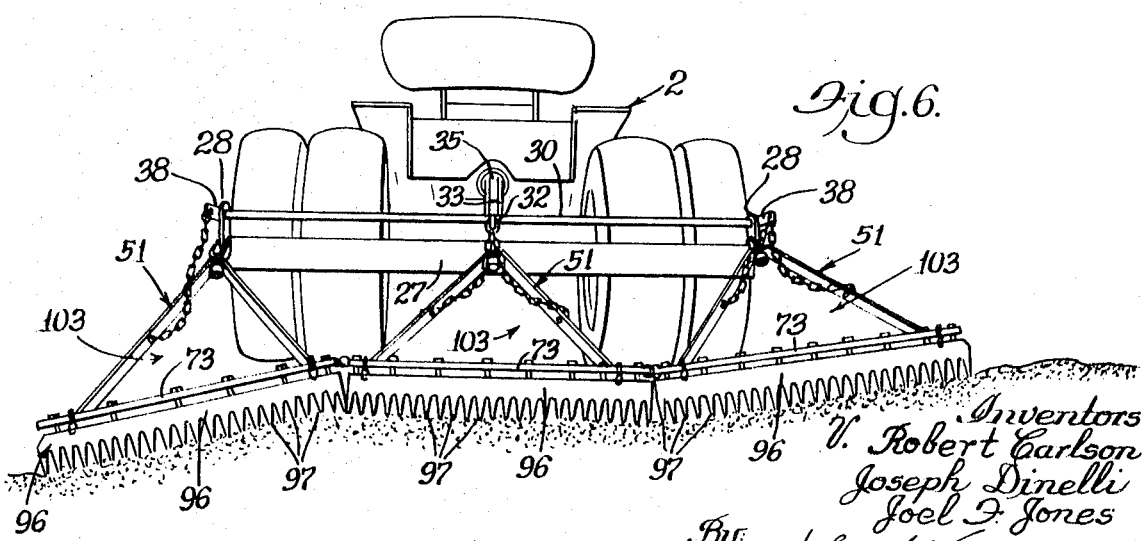
Fig.6.
Inventors
V. Robert Carlson
Joseph Dinelli
Joel F. Jones
By John J. Kowalik Atty.

SAND TRAP RAKE FOR GOLF COURSES

DISCUSSION OF THE PRIOR ART

As far as applicants know from extensive inquiries and from long and extensive association with golf course maintenance personnel, there is no adequate tractor drawn rake implement for preparing and maintaining sand traps in the golf course. The most common problem resides in the tractor digging into the sand and leaving substantial tracks or that rake is not flexible and cannot follow the terrain and varying contours of the trap or that it drags out too much of the sand out of the trap. Experimental demonstrations have heretofore shown that an inordinate amount of hand labor is required to supplement the action of previous known tractor drawn rakes.

SUMMARY OF THE INVENTION

The present invention is directed to a combination of a small tractor of the garden-lawn-type variety, one which is provided with a hydrostatic drive so that it may move at infinite speed, and a novel rake mounted thereon which covers an adequate transverse expanse and which has a plurality of relatively small, laterally spaced, independently floating connected sections which are constructed to follow the general terrain of the sand trap.

A still further object of the invention is to provide a novel rake which is made up of a plurality of sections, each section comprising a V-shaped draft member having a forwardly directed apex which has a universal connection to the tractor-mounted draft bar. The rear widely spaced legs of the draft member being rigidly connected to a transverse raking bar behind which is adjustably mounted a smoothing implement which functions to smooth the sand to form an acceptable surface.

A general object of the invention is to provide a novel sand trap rake comprising a plurality of end-to-end-arranged sections which are interconnected in a novel manner accommodating the raking sections to follow the general contour of the trap.

A more specific object of the invention is to provide a novel sand trap rake which is easily maneuverable and which comprises a plurality of sections each of which has an independent draft frame universally connected to the draw frame of the tractor and each comprising a toothed raking bar which support a smoothing comb in such manner that the comb will barely drag over the terrain in a trailing relation to the raking bar in order to adequately and effectively smooth the sand behind the raking bar.

A further object of the invention is to provide a novel arrangement of raking elements wherein adjacent raking elements overlap each other at their ends to provide uninterrupted coverage and then avoid leaving unraked areas.

A further object of the invention is to provide a rake wherein each of the sections are of identical construction so that they may be readily combined in any multiples.

A still further object of the invention is to provide a novel tractor rake combination wherein the tractor is operable at infinite speeds to correlate the movement of the tractor with the raking effect and wherein a gradual lifting of the rake is hydraulically controlled so that the feathering of the raking at the edges of the sand trap can be effectively accomplished.

These and other objects and advantages inherent in the invention will be more readily apparent from the specification and the drawings wherein:

FIG. 3 is a top perspective view of an enlarged scale taken from the rear of the rake;

FIG. 4 is a sectional view taken substantially on the line 4—4 of FIG. 3;

FIG. 5 is a fragmentary perspective view adjacent rake elements illustrating the arrangement of the overlap of the rake elements;

FIG. 6 is a rear view of the tractor and rake shown on a smaller scale;

Figure 1:
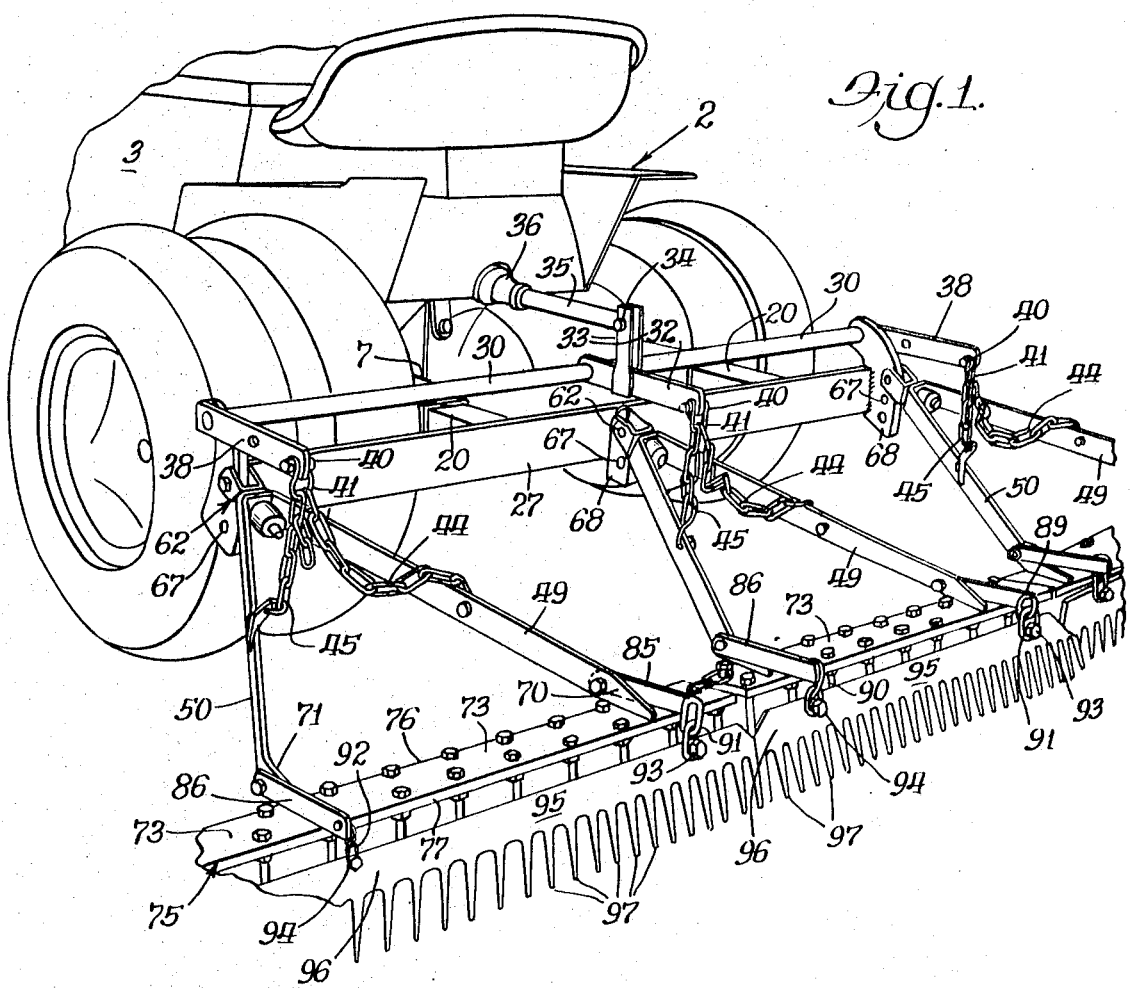
FIG. 1 is a perspective view of the rear end of a tractor with the novel rake structure mounted thereon.

Describing the invention in detail and having particular reference to the drawings there is shown a tractor generally designated 2 which is of a hydrostatic type well known to those skilled in the art which provides an infinite speed particularly adaptable to the instant rake in permitting operation of the rake in the sand without having the wheels dig holes in the sand and in dragging the rake at varying speeds as required to contour the sand trap.

The tractor 2 comprises a longitudinal frame portion 3 with a transverse rear axle assembly 4 having axle housings 5, 5 at opposite ends which serve as a mounting for the drawbar assembly generally designated 6.

The drawbar assembly 6 comprises fore-and-aft-extending generally parallel laterally spaced tubular mounting elements 7, 7 which at their forward ends are provided with jaw structures 8, each of which has a bottom jaw member 9 and a top jaw member 10 and a vertical bight portion 11. The bottom and top jaw members 10, 9 embrace the associated axle structure 5 and are provided with vertically aligned apertures 12, 12 forwardly of the axle and vertically aligned apertures 13, 13 rearwardly of the axle. Headed bolts 14 and 15 are respectively extended through apertures 12 and 13 and are drawn up by means of the nuts 16 and 17 in order to tightly secure the frame assembly 6. The elements 7, 7 are interconnected intermediate their ends by a transverse brace 18 and the rear ends of the member 7, 7 provides socket openings 19, 19 each of which receives therein a complementary square-shaped coupling element 20 disposed at each end of the drawbar structure 21. The elements 20 are inserted into respective sockets 19 and are provided with vertical openings 23 which align with openings 24 in respective elements 7 through which a quick detachable pin 25 is extended thereby removably securing respective elements 20 to the member 7.

The members 20 are interconnected by a transverse bar 27 which at each end is provided with an upstanding standard 28 in front thereof, each standard being provided with a bearing 29 through which there is journaled a rockshaft 30.

The rockshaft 30 is connected to a rearwardly extending lever arm 32 which intermediate its ends has a pair of jaw members 33 connected thereto, the jaw members 33 extending upwardly and at their upper ends being pivoted as at 34 to the rear end of a rod 35 which in turn is connected at its forward end to hydraulically operated lifting link 36 as well known to those skilled in the art, the link 36 as well as rod 35 being actuated axially and when moving in the forward direction raise the lever arm 32 and companion arms 38 at opposite ends of the rockshaft 30. When the rod 35 and link 36 are actuated in the rearward direction the rockshaft 30 rotates in a clockwise direction and therefore the arms 32 and 38 are lowered.

The rear end of each arm 32 and 38 is pivotally connected on a horizontal axis by means of a pin 40 to a U-shaped clevis 41 which receives the upper links 42 and 43 of downwardly diverging chain lengths 44 and 45, which chains are pivotally connected by pins 47 and 48 on substantially horizontal axes to arms 49 and 50 of an associated draft frame member generally designated 51.

Each frame member 51 is of V-shaped form having its legs 49 and 50 converging forwardly into an apical structure 53.

The structure 53 includes a transverse element 54 which interconnecting the upper forward ends of the legs 49 and 50, has opening 55 therethrough which extends a pin 56 which also extends through aligned opening 57 in a bearing 58 which is connected to the rear side of the member 54 to provide an enlarged bearing surface. A pin 56 extends through an opening 60 in the bight portion 61 of a U-shaped clevis member 62 which comprises a pair of forwardly extending legs 63, 64 which at their forward ends are provided with aligned openings receiving a pin 66 therethrough disposed substantially horizontally, said pin 66 extending for adjustment through any one of a series of openings 67 in a vertically extending anchor block 68 which is connected to the rear side of the member 27 and extends vertically with respect to the ground. Thus each frame member pivots about the shaft 56 as well as the shaft or pin 66 and is accommodated in universal angular movement.

The rear end portions 70 and 71 of the legs 49 and 50 are sheared diagonally as at 72 and 73 and are weld connected to the top of a substantially horizontally disposed plate 73 of a generally horizontally disposed rake bar broadly indicated 75.

The rake par 75 comprises the plate 73 which is a substantially flat element having generally parallel front and rear edges 76 and 77 and diagonal end edges 78 and 79 whereby in plan view the plate has a rhomboidal shape. Adjacent to the front edge of the plate there are provided a plurality of vertically disposed teeth 80, 80 and along the rear edge are provided another set of teeth 81, 81. The teeth in the present instance are shown as being extended through apertures in the plate 73 and connected thereto by means of threaded nuts 82, 83 which embrace the plate 73 therebetween. It will be understood, however, that this type of connection is merely shown by way of illustration and that other connections such as direct welding of the upper ends of the teeth which are in the form of round rods of metal and may be substituted. The teeth in the back row are offset transversely with respect to the teeth of the front row to provide complete raking coverage from end-to-end of the rake bar.

Rear end portion 70 and 71 of legs 49, 50 carry upwardly and rearwardly extending hanger arms 85 and 86 which at their lower forward ends are pivotally connected by means of locking nut and bolt assemblies 87 and 88 to the portions 70 and 71 respectively whereby said arms 85 and 86 may be adjusted vertically. The rear end portions of the arms 85 and 86 are connected as by welding to chain links 89 and 90 which are looped through lower chain links 91 and 92 respectively which in turn are bolted by means of nut and bolt assemblies 93 and 94 to opposite ends of the upper portion 95 of a comblike element generally designated 96 which has a plurality of closely spaced V-shaped teeth 97 formed in its lower portion. As best seen in FIG. 6 the combs 96 trail the rakes and are adapted to sweep over the land which has been raked by the rake members thereahead.

Figure 2:
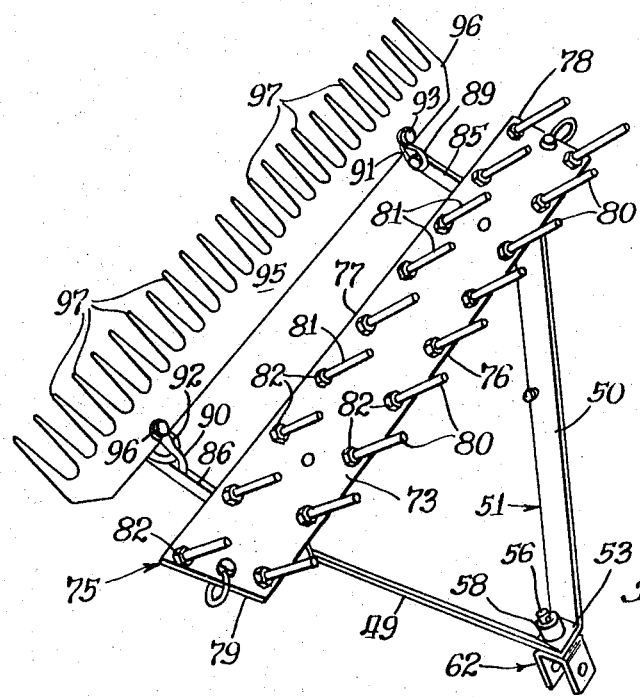
FIG. 2 is a perspective bottom view of a rake section.
Figure 7:
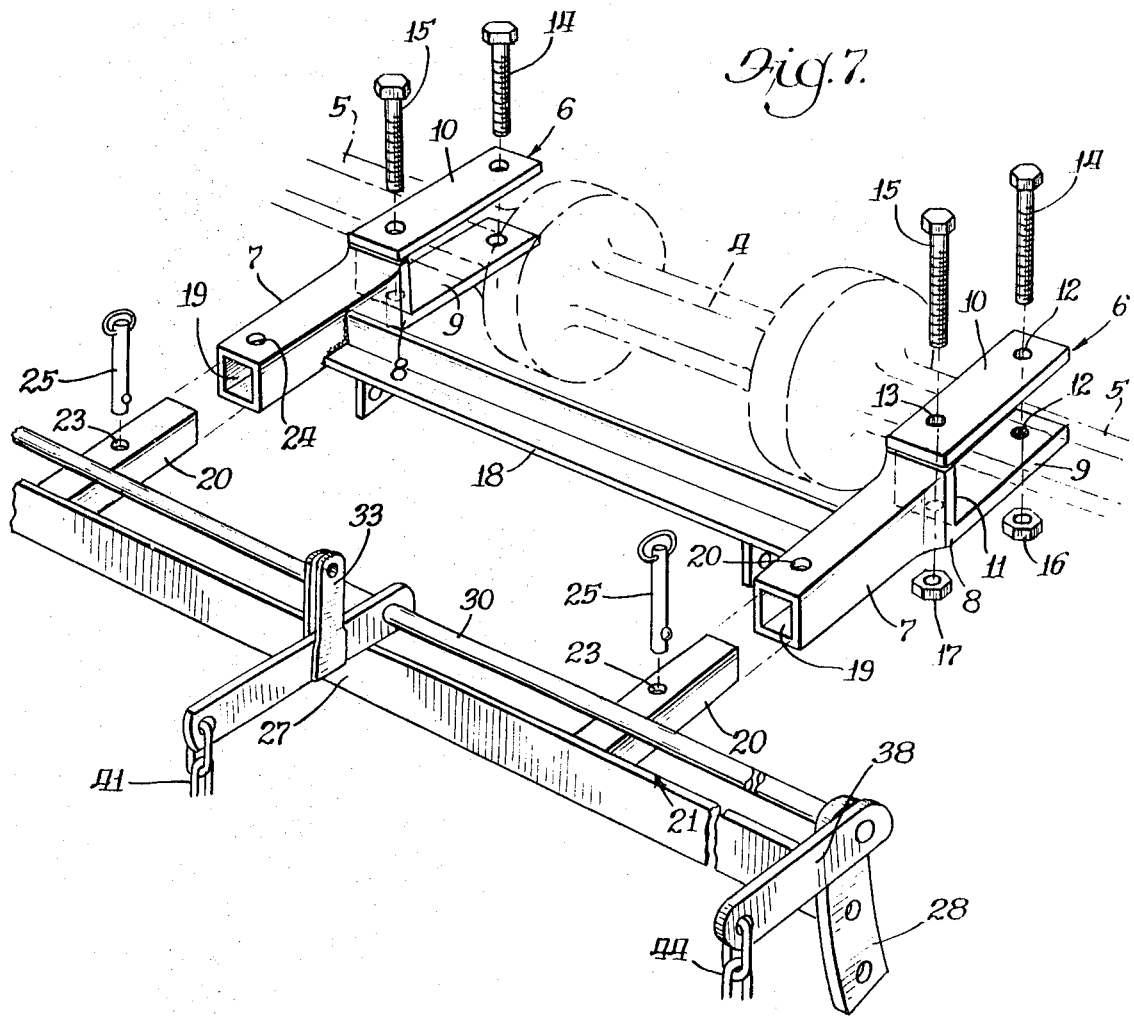
FIG. 7 is an exploded view on an enlarged scale showing the mounting of the draft frame to the tractor.
Figure 8:
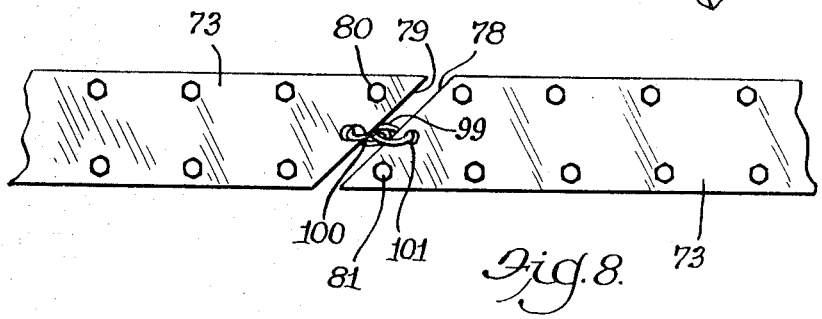
FIG. 8 is a fragmentary plan view of adjacent bars illustrating their connection to each other and overlap in the operating direction of the rake.
Figure 9:
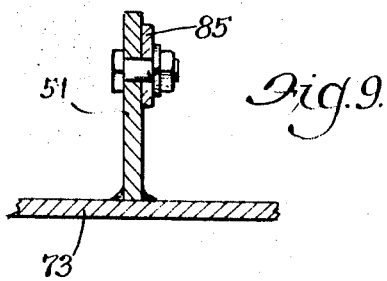
FIG. 9 is an enlarged sectional view taken substantially on the line 9—9 of FIG. 3.

As best seen in FIG. 8 and FIG. 2 each bar member 73 of each rake structure has its angled end portion or edge 78 tucked behind the edge 79 of the adjacent rake section and the endmost tooth 81 is positioned with the forward tooth 80 of the adjacent section in a spaced relationship transversely of the raking structure in much the same manner as the spacing of the front and rear teeth in each section. Thus in raking there is no void between the end sections.

End portions 78 of each section is connected to the end portion 79 of the adjacent section by universal connection generally designated 99 which is in the form of a pair of chain links looped through each other and connected as at 100 and 101 to the adjacent end portions in area substantially therebetween the front and rear edges of the rake sections. Thus the several sections can assume angular disposition with respect to one another particularly in view of the universal connection of the draft frames to the drawbar and because of the fact that the lifting linkage is flexible being in the nature of the chains 44, 45.

It will be realized that each rake section identified at 103, 103 is identical with every other section and that these sections are flexible vertically on horizontal transverse axis as well as a fore and aft axis and that the raking members in view of their short length of about 12 inches can readily follow the undulating contour of a sand trap. This in conjunction with the hydraulic lift arrangement and the infinite speed of the tractor allows the operator to adjust forward movement to eliminate digging the wheels in and (by the hydraulic lift such operator can concurrently) gradually raise the rake and feather out at the edges of the trap without dragging the sand out of the trap. The rake has been successfully tested and performs as described.

Having described the preferred embodiment of the invention it can be readily apparent that other modifications will become apparent to those skilled in the art within the scope of the instant disclosure.

What is claimed is:

1. In a sand trap rake, the combination of a tractor having a transmission for driving the tractor at infinitely variable speeds and having a powered lift system, the combination of a draw frame secured to the tractor, a plurality of flexibly interconnected short-section rake assemblies disposed in end-to-end relation transversely of the tractor in trailing relation thereto, independent draft frame means connected to each rake assembly, means connecting each draft frame means to said tractor for universal angling movements with respect thereto, and means operatively connecting each frame means to said lift system, means for holding the respective draft frame means from lateral movement while accommodating vertical swinging movements, means accommodating vertical canting of the respective draft frame means about upwardly and forwardly inclined axes, each draft frame means comprising a V-shaped frame including coplanar legs sloping upwardly forwardly and having lower rear end portions, and the rake assembly comprising a bar connected to the rear end portions and having a plurality of teeth depending from the bar and each said holding means comprising a member pivotally connected to the draw frame for vertical swinging movement only, said canting accommodating means comprising an apical portion on the respective draft frame and a pivot member connecting the apical portion to the respective member on said inclined diagonally upwardly and forwardly axis.

2. The invention according to claim 1 and universal means connecting adjacent end portions of respective bars for controlling relative elevations therebetween.

3. The invention according to claim 1 and arms adjustably mounted on the rear end portions of the legs for positioning at selected elevations and extending behind the related bar, and comb means swingably suspended from the arms behind the respective bar and having relatively closely spaced teeth.

4. In a sand trap rake, the combination of a tractor having a transmission for driving the tractor at infinitely variable speeds and having a powered hydraulic lift system, the combination of a draw frame secured to the tractor, a plurality of flexible interconnected short-section rake assemblies disposed in end-to-end relation transversely of the traction in trailing relation thereto, independent draft frame means connected to each rake assembly, means connecting each draft frame means to said tractor for universal angling movements with respect thereto, and means operatively connecting each draft frame means to said lift system, and each draft frame means comprising a V-shaped frame including coplanar legs sloping upwardly forwardly and having lower rear end portions, and the rake assembly comprising a bar connected to the rear end portions and having a plurality of teeth depending from the bar, arms adjustably mounted on the rear end portions of the legs for positioning at selected elevations and extending behind the related bar, comb means swingably suspended from the arms behind the respective bar and having relatively closely spaced teeth, said means connecting each assembly to the lift system comprising a rockshaft journaled on the draw frame and extending transversely of the tractor and having a plurality of rearwardly extending arms connected thereto in vertical alignment with respective draft frame means, and a linkage extending from each arm to the adjacent draft frame means and comprising a pair of depending chain lengths connected at their upper ends at a common point to the respective arm and at their lower ends at laterally spaced points to the respective draft frame means whereby upon lifting each side of the draft frame means will automatically position at a common level.

5. In a rake attachable to a tractor, a draw frame comprising a transverse frame member, a rockshaft journaled thereon, a plurality of V-shaped draft frames spaced lengthwise of said frame member in trailing relation thereto and each having an apex adjacent to said frame member and a pair of rearwardly diverging legs terminating in rear end portions, anchor elements on the frame member, one for each draft frame spaced on the order thereof, a universal connection between the apex of each draft frame and the related anchor element, said connection comprising a clevis pivoted to the associated anchor element on a generally horizontal axis extending generally parallel with said frame member, said clevis having a bright portion abutting the apex of the associated draft frame and a pin pivotally connecting the same on an axis substantially normal to the axis of pivot of the clevis-accommodating lateral-tilting movements of the draft frame, a rake assembly comprising a rake bar extending across the rear ends of the legs of each draft frame and rigidly connected thereto, and means flexibly connecting said rake assemblies to prevent the same from spreading apart while accommodating tilting of the rake assemblies with the draft frame to follow terrain contours.

6. The invention according to claim 5 and a fine tooth comb pendulously mounted behind each rake bar for smoothing the material raked by the bar.

7. The invention according to claim 6 and the bars being disposed in end-to-end relation and each bar having a toothed portion disposed in fore and aft overlapped relation with the adjacent bars.

8. A rake assembly comprising a plurality of independently floating draft frames having front and rear ends, toothed bars disposed in end-to-end relation connected to the rear ends of respective frames, each bar having a toothed end portion formed and arranged to complementally fit a similar end portion of the adjacent bar to eliminate spacing therebetween, means flexibly interconnecting adjacent end portions to accommodate limited angular displacement in vertical planes of the connected bars, mounting means, and universal means providing fixed transverse and longitudinal axes individually connecting the forward end of each frame to the mounting means and affording pivotal canting movement of the individual frames about said fixed longitudinal axis and limited independent vertical movements only about said fixed transverse axes.

9. For use with a tractor having a lift system, a sand trap rake comprising a draw frame adapted for connection to the tractor, a plurality of flexibly interconnected short-section rake assemblies disposed transversely of the draw frame in trailing relation thereto, independent draft frame means connected to each rake assembly, means connecting each draft frame means to said tractor for universal angling movements with respect thereto, means operatively connecting each frame means to said lift system, each draft frame means comprising a V-shaped frame including coplanar legs sloping upwardly forwardly and having lower rear portions, and each rake assembly comprising a bar connected to the rear end portions and having a plurality of teeth depending from the bar, arms adjustably mounted on the rear end portions of the legs for positioning at selected levels and extending behind the related bar, comb means swingably suspended from the arms behind the respective bar and having relatively closely spaced teeth, and said means connecting each assembly to the lift system comprising a rockshaft journaled on the draw frame and extending transversely of the tractor and having a plurality of rearwardly extending arms connected thereto in vertical alignment with respective draft frames, and a linkage extending from each arm to the adjacent draft frame and comprising a pair of depending chain lengths connected at their upper ends at a common point to the respective arm and at their lower ends at laterally spaced points to the respective frame whereby upon lifting each side of the draft frame will automatically position at a common level.